United States Patent
Boul et al.

(10) Patent No.: US 11,566,487 B2
(45) Date of Patent: Jan. 31, 2023

(54) SYSTEMS AND METHODS FOR SEALING CASING TO A WELLBORE VIA LIGHT ACTIVATION

(71) Applicant: HALLIBURTON ENERGY SERVICES, INC., Houston, TX (US)

(72) Inventors: Peter James Boul, Houston, TX (US); John L. Maida, Houston, TX (US); Krishna Ravi, Kingwood, TX (US); Gary P. Funkhouser, Roman Forest, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 48 days.

(21) Appl. No.: 17/039,286

(22) Filed: Sep. 30, 2020

(65) Prior Publication Data

US 2021/0238953 A1 Aug. 5, 2021

Related U.S. Application Data

(60) Provisional application No. 62/969,004, filed on Jan. 31, 2020.

(51) Int. Cl.
*E21B 33/14* (2006.01)
*C09K 8/467* (2006.01)
*E21B 47/135* (2012.01)

(52) U.S. Cl.
CPC .............. *E21B 33/14* (2013.01); *C09K 8/467* (2013.01); *E21B 47/135* (2020.05)

(58) Field of Classification Search
CPC ...................................................... E21B 33/00
See application file for complete search history.

(56) References Cited

U.S. PATENT DOCUMENTS

| | | | |
|---|---|---|---|
| 2,838,116 | A | 6/1958 | Clark, Jr. et al. |
| 3,250,330 | A | 5/1966 | Smith, Jr. |
| RE27,459 | E | 8/1972 | Guinn et al. |
| 4,832,121 | A | 5/1989 | Anderson |
| 5,275,038 | A | 1/1994 | Sizer et al. |
| 5,375,661 | A | 12/1994 | Daneshy et al. |

(Continued)

FOREIGN PATENT DOCUMENTS

| | | |
|---|---|---|
| GB | 2328968 A | 3/1999 |
| WO | 2002057805 A2 | 7/2002 |

(Continued)

OTHER PUBLICATIONS

Johnson, D.O., et al., Society of Petroleum Engineers (SPE) Paper # 77460, "Identification of Steam Breakthrough Intervals Using DTS Technology," Sep. 2002.

(Continued)

*Primary Examiner* — William D Hutton, Jr.
*Assistant Examiner* — Avi T Skaist
(74) *Attorney, Agent, or Firm* — Novak Druce Carroll LLP

(57) ABSTRACT

Activating a reaction of a sealant, such as cement, with a fiber optic cable, the reaction causing hardening of the sealant. The sealant may be used in wellbore cementing operations to cement a casing in a wellbore. The fiber optic cable may be deployed by attaching it to the outside of a casing during insertion into the wellbore. The activation of the sealant can be via thermal or optical initiation in order to causing a hydration reaction or polymerization.

18 Claims, 13 Drawing Sheets

(56) References Cited

U.S. PATENT DOCUMENTS

| | | | |
|---|---|---|---|
| 5,892,176 | A | 4/1999 | Findlay et al. |
| 5,996,689 | A | 12/1999 | Head |
| 6,268,911 | B1 | 7/2001 | Tubel et al. |
| 6,367,548 | B1 | 4/2002 | Purvis et al. |
| 6,531,694 | B2 | 3/2003 | Tubel et al. |
| 6,532,839 | B1 | 3/2003 | Kluth et al. |
| 7,055,604 | B2 | 6/2006 | Jee et al. |
| 7,448,448 | B2 | 11/2008 | Lovell et al. |
| 7,617,873 | B2 | 11/2009 | Lovell et al. |
| 9,708,867 | B2 | 7/2017 | Lovell et al. |
| 2002/0007945 | A1 | 1/2002 | Neuroth et al. |
| 2004/0047534 | A1* | 3/2004 | Shah ............... E21B 47/135 385/12 |
| 2010/0247794 | A1 | 9/2010 | Baily et al. |
| 2011/0183873 | A1 | 7/2011 | Bailey et al. |
| 2016/0053572 | A1 | 2/2016 | Snoswell |

FOREIGN PATENT DOCUMENTS

| | | |
|---|---|---|
| WO | 2004018840 A1 | 3/2004 |
| WO | 2015107332 A1 | 7/2015 |

OTHER PUBLICATIONS

Fryer, V., et al., Society of Petroleum Engineers (SPE) Paper # 92962, "Monitoring of Real-Time Temperature Profiles Across Multizone Reservoirs During Production and Shut-In Periods Using Permanent Fiber-Optic Distributed Temperature Systems," Apr. 2005.

Economides, M.J., "a practical companion to reservoir stimulation," Developments in Petroleum Science, vol. 34, 1992.

Economides, M.J. et al., "Reservoir Stimulation," Second Edition, 1989.

Smith, Robert, et al., Society of Petroleum Engineers (SPE) Paper # 2686, "Computer Study of Factors Affecting Temperature Profiles in Water Injection Wells," Journal of Petroleum Engineering, p. 1447, Nov. 1970.

Rajah, Benny, et al., Society of Petroleum Engineers (SPE) Paper #29290, "Experiences and Results of Acid Prepacking and Gravelpacking Wells in the West Luton Field in Sarawak, Malaysia," Mar. 1995.

Wehunt, Jr., C.D., Society of Petroleum Engineers (SPE) Paper# 20137, "Evaluation of Alternating Phase Fracture Acidizing Treatment Using Measured Bottomhole Pressure," Mar. 1990.

Nelson, R.L., et al., Society of Petroleum Engineers (SPE) Paper# 39943, "Multiple Pad-Acid Fracs in a Deep Horizontal Well," Apr. 1998.

Krawietz, T.E., et al., Society of Petroleum Engineers (SPE) Paper # 27809, "Horizontal Well Acidizing of a Carbonate Formation: A Case History of Lisburne Treatments, Prudhoe Bay, Alaska," Nov. 1996.

International Search Report and Written Opinion, PCT Application No. PCT/US2020/053797, dated, Jan. 15, 2021.

\* cited by examiner

SYSTEMS AND METHODS FOR SEALING CASING TO A WELLBORE VIA LIGHT ACTIVATION

CROSS-REFERENCE TO RELATED APPLICATIONS

This application claims the benefit of U.S. Provisional Application No. 62/969,004, filed on Jan. 31, 2020, the disclosure of which is hereby incorporated by reference in its entirety.

FIELD

The present disclosure is directed to cementing operations in a wellbore, and in particular to activating the hardening of cement so as cement a casing within a wellbore.

BACKGROUND

Wellbores are formed by drilling deep into subterranean formations in order to withdrawn hydrocarbons. Typically, after drilling, the wellbore is then lined with a steel casing so as to maintain the shape of the wellbore and to prevent the loss of fluids to the surrounding environment. The steel casing also facilitates pumping fluid into and out of the wellbore and also facilitates zonal isolation. The steel casing is often bonded to the surface of the wellbore by cement or other sealant.

Fiber optics have been employed in wellbore environments for sensing various properties, for example temperature or pressure. Light is transmitted from the surface through the fiber optic cables and is eventually received by a detector. Upon experiencing changes in the light during its transmission, the corresponding changes can be used to determine downhole properties.

BRIEF DESCRIPTION OF THE DRAWINGS

Implementations of the present technology will now be described, by way of example only, with reference to the attached figures, wherein.

DETAILED DESCRIPTION

Figure 1A:
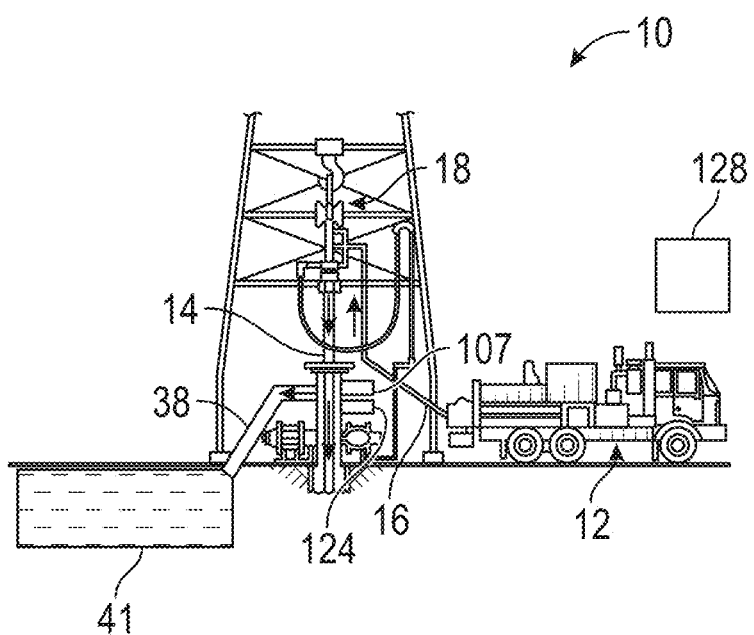
FIG. 1A illustrates a system for preparation and delivery of a cement composition to a well bore in accordance with aspects of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

The present disclosure provides for activating a reaction of a sealant by use of an optical fiber, which may be provided in a fiber optic cable. The optical fiber initiates a reaction in the sealant by producing heat and/or by exposing the sealant to light emitted from the optical fiber. The activation of the reaction begins curing the sealant and initiates the process toward hardening of the sealant so that the sealant may bond surfaces together, such as a casing to the surface of a wellbore. The hardening of the sealant desirably occurs at or near the bottom or downhole portion of the sealant in the wellbore, and propagates uphole toward the surface. The sealant may be cementitious or resinous and a may be used in cementing operations in the wellbore.

The reaction of the sealant activated by the optical fiber may include a hydration reaction and/or polymerization reaction. This may be referred to as curing or setting of the cement, and as used herein, curing and/or setting refers to both a heat of hydration reaction and/or a polymerization reaction. The optical fiber may activate the hydration reaction by producing sufficient heat to initiate the reaction, which may include the emission of light from the optical fiber. For activation of polymerization, initiators or photoinitiators may be employed which initiate polymerization and curing of the sealant. The optical fiber may produce heat sufficient to exceed the activation energy for inducing polymerization, and/or light may be emitted which contacts a photoinitiator thereby causing a photochemical reaction and initiation of polymerization, also resulting in curing and hardening of the sealant. Additionally or alternatively, the optical fiber may be used to destroy retardants in the sealant, which when destroyed permit curing and hardening process of the sealant.

Fiber optic cables may be manipulated to release, or leak, light. The fiber optic cables may emit light by micro-bends or macro-bends in the fiber optic cables. Furthermore, light may be emitted by shrinkage of the fiber optic cable. Moreover, a fiber fuse may be employed where the distal end of the fiber optic cable releases optical energy and heat energy and propagates back toward the optical fiber light source. The light of the optical fiber may also be converted from one wavelength to another. The light may be UV, visible light, infrared or near-infrared, and may be transmitted downhole as one wavelength and converted to another wavelength. For instance, the light may be upconverted from an infrared spectrum to the ultraviolet or a visible spectrum. The conversion of light to the ultraviolet or a visible spectrum may be used to activate photoinitiators which react when exposed to these spectrums.

The sealant activation described herein may be employed in cementing operations. After drilling a wellbore a casing is inserted into a wellbore and a sealant pumped either through the bore and up through the annulus, or in the reverse, down through the annulus. In either case one or more optical fibers may be disposed in the sealant either before, after, or with delivery of the sealant. The optical fiber may be provided around the casing as it is being inserted into the wellbore.

FIG. 1A illustrates an exemplary downhole sealant environment 10 in which the present disclosure may be implemented. The sealant unit 12, which may be a truck as shown, may include mixing equipment and pumping equipment. The sealant unit 12 may pump a sealant 14 through a feed pipe 16 and to a sealant head 18 which conveys the sealant 14, which may be cement, downhole, for example into the wellbore 22 of FIG. 1B. At least a portion of the displaced fluids from the annulus may exit the wellbore annulus 32 via a flow line 38 and be deposited, for example, in one or more retention pits 41 (e.g., a mud pit). A laser 107 can transmit light through a fiber optic cable (see FIG. 1B), and a receiver 124 may be provided, both the laser 107 and receiver 124 may be communicatively coupled to a control unit 128.

Figure 1B:
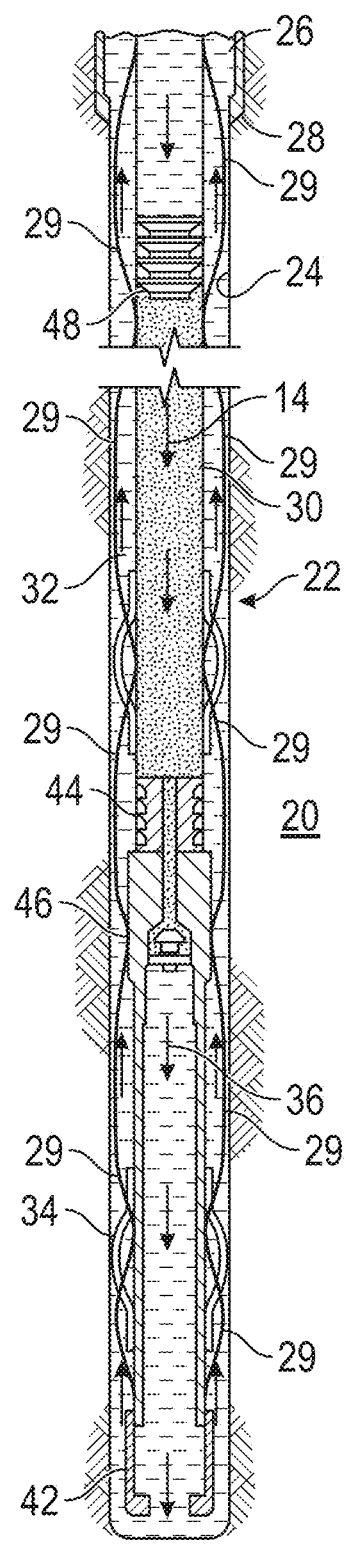
FIG. 1B is a diagram illustrating placement of a sealant into a well bore annulus having a fiber optic cable in accordance with aspects of the present disclosure.

As illustrated in FIG. 1B, a wellbore 22 which may be drilled into the subterranean formation 20. While wellbore 22 is shown extending generally vertically into the subterranean formation 20, the disclosure herein also includes wellbores that extend at an angle through the subterranean formation 20, such as horizontal and slanted wellbores. As illustrated, the wellbore 22 comprises surface 24. In the illustrated embodiments, a surface casing 26 has been inserted into the wellbore 22. The surface casing 26 may be cemented to the surface 24 of the wellbore 22 by cement sheath 28.

In the illustrated embodiment, casing 30 may also be disposed in the wellbore 22. A casing 30 may be encompass any conduit (e.g., intermediate casing, production casing, liners, etc.). As illustrated, there is a wellbore annulus 32 formed between the casing 30 and the surface 24 of the wellbore 22 and/or the surface casing 26. One or more centralizers 34 may be attached to the casing 30, for example, to centralize the casing 30 in the wellbore 22 prior to and during the cementing operation.

Figure 1C:
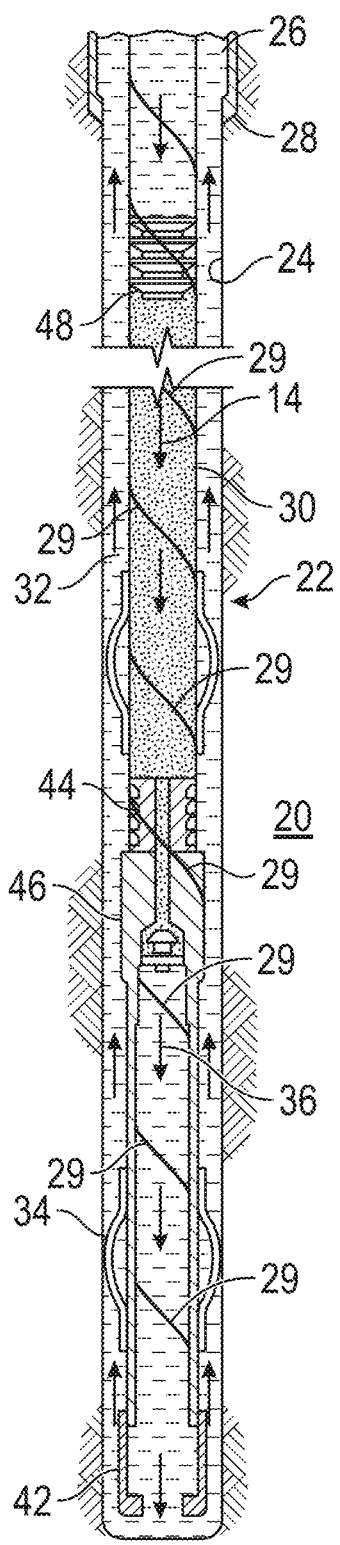
FIG. 1C is a diagram illustrating placement of a sealant into a well bore annulus having a fiber optic cable in accordance with aspects of the present disclosure.

The fiber optic cable is arranged so as to be proximate the sealant, such as passing through the cement, or immediately adjacent, or otherwise arranged to expose the sealant to light and/or heat. One way to arrange the fiber optic cable is to attach it to the casing as it is being inserted into the wellbore. For instance, as shown in FIG. 1B, as the casing 30 is inserted into the wellbore, a fiber optic cable 29, having one or more optical fibers, may be attached to an external surface of the casing 30. The fiber optic cable 29 may extend longitudinally along the side of the casing 30 as shown in FIG. 1B, or the fiber optic cable 29 may be wrapped around the casing 30 in helical fashion as shown in FIG. 1C. Any configuration of the fiber optic cable 29 may be provided in the sealant 14 and annulus 32, such as straight, helical, or other arrangements in order to optimize exposure of light and/or heat to the sealant 14 and curing of the sealant 14. A plurality of a fiber optic cables 29 may be employed to provide further areas of contact of the fiber optic cable with the sealant.

Referring back to FIG. 1A, as mentioned a laser 107 can transmit light through the fiber optic cable 29. A receiver 124 can be communicatively coupled to a control unit 128 located away from the wellbore 102 by wire or wireless communication. A receiver may be omitted entirely as well in activation of sealant reaction operations as disclosed herein. The receiver 124 can transmit information related to the optical signal, for example but not limited to the light pulse count, the time the light pulse arrived, or other information, to the control unit 128. The laser 107 may be communicatively coupled to the control unit 128 which may control the light transmitted through the fiber optic cable 29, in order to expose the sealant 14 to light and/or heat.

With continued reference to FIG. 1B, the sealant 14 may be pumped down the interior of the casing 30. The sealant 14 may be allowed to flow down the interior of the casing 30 through the casing shoe 42 at the bottom of the casing 30 and up around the casing 30 into the wellbore annulus 32. The sealant 14 may be allowed to set in the wellbore annulus 32, for example, to form a cement sheath that supports and positions the casing 30 in the wellbore 22. While not illustrated, other techniques may also be utilized for introduction of the sealant 14. By way of example, reverse circulation techniques may be used that include introducing the sealant 14 into the subterranean formation 20 by way of the wellbore annulus 32 instead of through the casing 30.

As it is introduced, the sealant 14 may displace other fluids 36, such as drilling fluids and/or spacer fluids, that may be present in the interior of the casing 30 and/or the wellbore annulus 32. At least a portion of the displaced fluids 36 may exit the wellbore annulus 32 via a flow line 38 and be deposited, for example, in one or more retention pits 40. A bottom plug 44 may be introduced into the wellbore 22 ahead of the sealant 14, for example, to separate the sealant 14 from the fluids 36 that may be inside the casing 30 prior to cementing. After the bottom plug 44 reaches the landing collar 46, a diaphragm or other suitable device ruptures to allow the sealant 14 through the bottom plug 44. The bottom plug 44 is shown on the landing collar 46. In the illustrated embodiment, a top plug 48 may be introduced into the wellbore 22 behind the sealant 14. The top plug 48 may separate the sealant 14 from a displacement fluid and also push the sealant 14 through the bottom plug 44.

Figure 2:
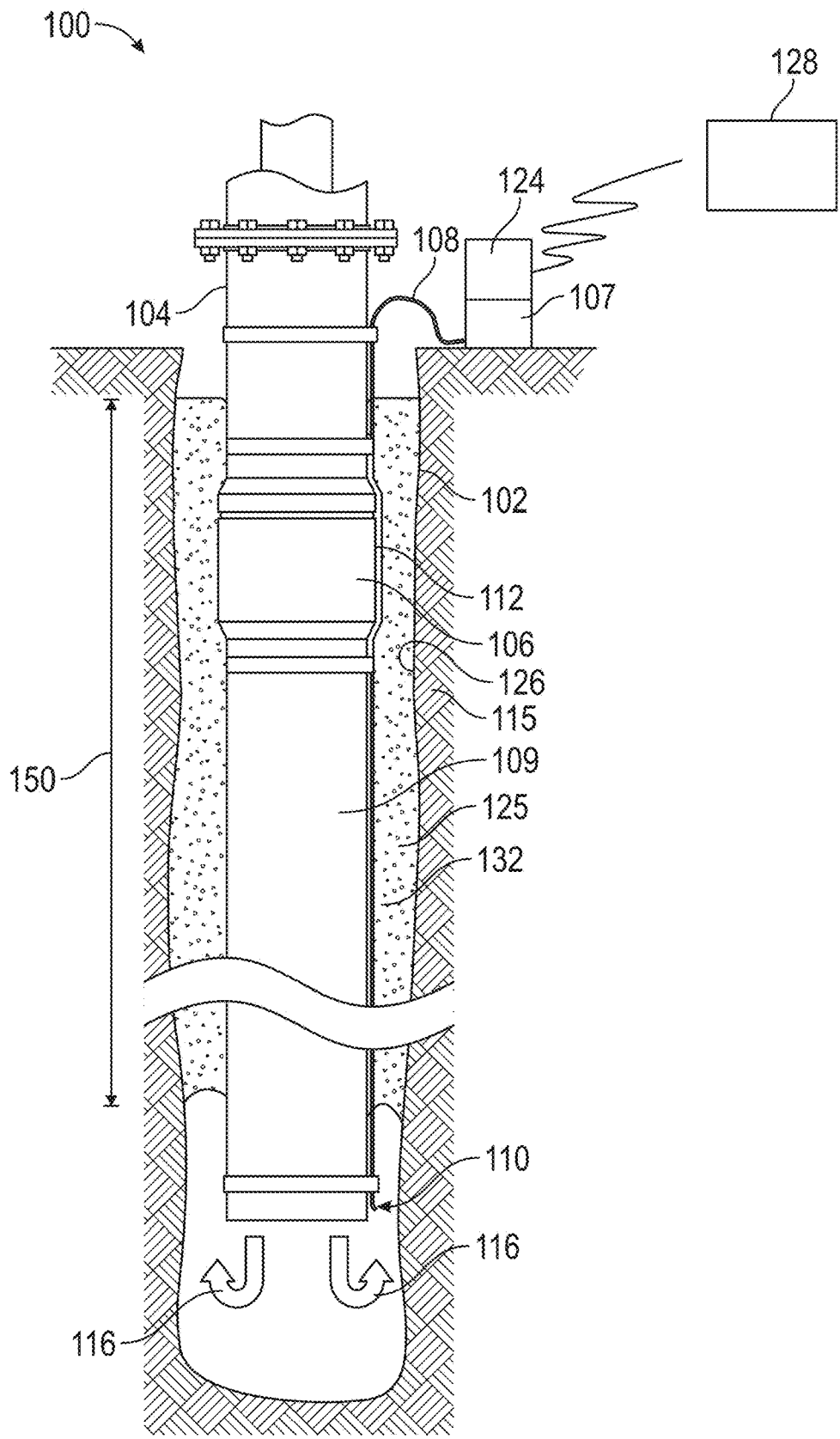
FIG. 2 is a diagram illustrating a cement slurry within the annulus of a wellbore and having a fiber optic cable disposed therein in accordance with aspects of the present disclosure

FIG. 2 illustrates an exemplary cementing environment 100 with the cement and fiber optic cable already arranged in the annulus of the wellbore. As shown a casing 104 is inserted into the wellbore 102 within a surrounding formation 115. As further shown a cement 125 is provided within the annulus 132 between the casing 104 and the surface 126 of the wellbore 102. The cement 125 extends along a plurality of depths 150. The cement 125 is in a slurry state as it is in a flowable state and not fully hardened. The arrows 116 illustrate that the cement 125 has flowed out of the bottom 110 of the casing 104 an into the annulus 132.

A fiber optic cable 108 may be inserted into the wellbore 102 along the length of the casing 104 which may be made up of a plurality of tubing joints and collars. In order to install the fiber optic cable 10, it may be attached to the casing 104 via attachment to collar 106 as the casing 104 is inserted into the wellbore. Although one tubing joint 109 is shown, a casing 104 is made up of a plurality of such tubing joints 109 coupled by collars 106 forming a string and the fiber optic cable 108 may be attached to the collars 106 and/or tubing joints 109 during insertion of the casing 104. Tubing joints 109 may be tubular with a hollow bore for flow of fluids, and are often from 30 feet to 40 feet long. Alternatively or additionally, the fiber optic cable 108 may be dispensed via a bobbin or reel at the surface or attached to an end of the casing 104 or along its length to dispense in the annulus 105. The fiber optic cable 108 may attach to a laser 107 and receiver 114 which are communicatively coupled to a control unit 128. The laser 107 may transmit light through the fiber optic cable 108 in pulses or other pattern, and the signal or data analyzed by the control unit 128.

Figure 3:
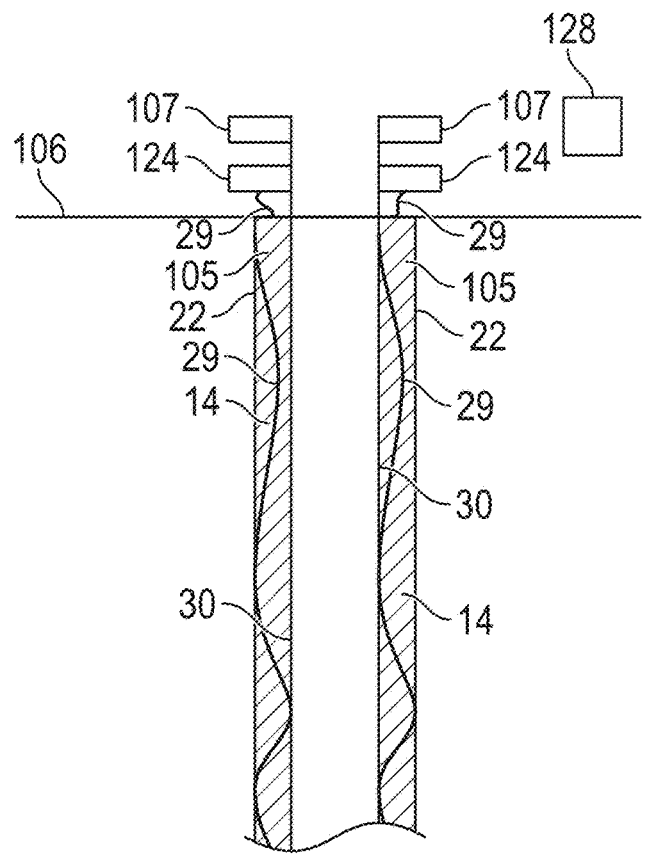
FIG. 3 illustrates an exemplary wellsite having a fiber optic cable arranged in a sealant.

FIG. 3 illustrates the fiber optic cable 29 arranged proximate the sealant 14, namely extending within and through the sealant in the annulus 105, once the sealant 14 has been placed within the annulus 105. Although one optical fiber 29 is shown, there can be a plurality of optical fibers passing through and in contact with the sealant 14. As shown the laser 107 can transmit light through the fiber optic cable 29, and there may also be a receiver 124 to receive any light. While a receiver is not required for activating the reaction of the sealant, it may be employed for use.

The fiber optic cable 29 can be actuated to produce heat and/or emit light to the surrounding the sealant 14 and therefore activate a reaction within the sealant 14, such as a thermal or optical initiation of reaction within the sealant 14.

Figure 4:
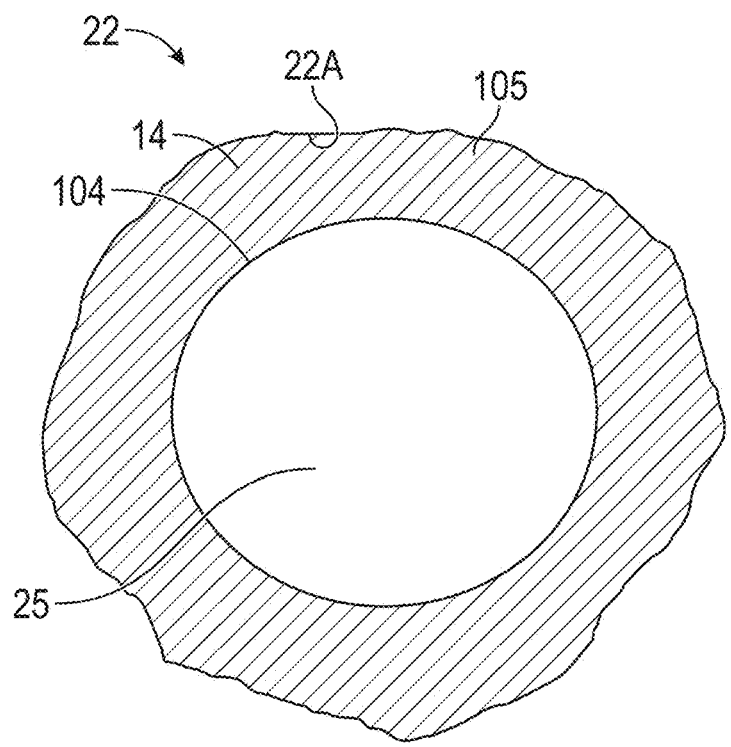
FIG. 4 illustrates an overhead sectional view of a wellbore 22 having a sealant placed in an annulus of a wellbore.

FIG. 4 illustrates an overhead sectional view of a wellbore 22. As shown, the sealant 14 is contained within the annulus 105, which is the space between the casing 104 and the surface 22A of the wellbore 22. A central bore 25 is shown within the casing 104 through which fluid may be pumped into or out from the wellbore 22. The width of the annulus 105 may vary and may depend on a plurality of factors such as the diameter of the drilling device used to drill the wellbore and the diameter of the casing, as well as any non-uniformities in the surface 22A of the wellbore 22 from the drilling. The width may be from ¼ inch to 2 inches, alternatively from ½ inch to 1½ inches, alternatively from ⅝ inches to 1 inch, and combinations of the aforementioned.

Figure 5A:
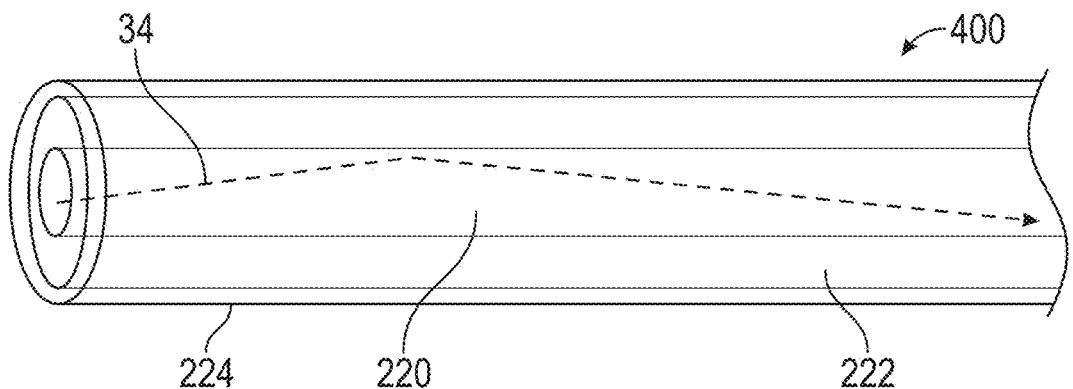
FIG. 5A illustrates one example of an optical fiber optic cable that can be used with the embodiments herein.

FIG. 5A illustrates one example of an optical fiber cable 400 that can be used with the embodiments herein. The optical fiber cable 400 can include a core 220 having one or a plurality of optical fibers and a cladding 222. A light 340 may be transmitted through the optical fiber cable 400. The optical fiber cable 400, including the core 220 and cladding 222 can be made of silica, fluorozirconate glass, fluoroaluminate glass, phosphate glass, sapphire glass, chalcogenide glass, crystalline materials, plastic (such as polystyrene or polymethylmethacrylate PMMA) or any other suitable material. In particular, the core 220 and/or cladding 222 can be made of silica. Additionally, the optical fiber cable 400 can include, for example, titanium, chromium, nano-rods, nano-stars, or microbeads. The optical fiber cable 400 can also be doped, for example, using quantum dots, dyes, neodymium, ytterbium, erbium, thulium, praseodymium, holmium, or any other suitable ion. The optical fiber cable 400 used in conjunction with the downhole radiation sensor can also include a jacket 224, to protect the internal contents from the harsh environment downhole.

Figure 5B:
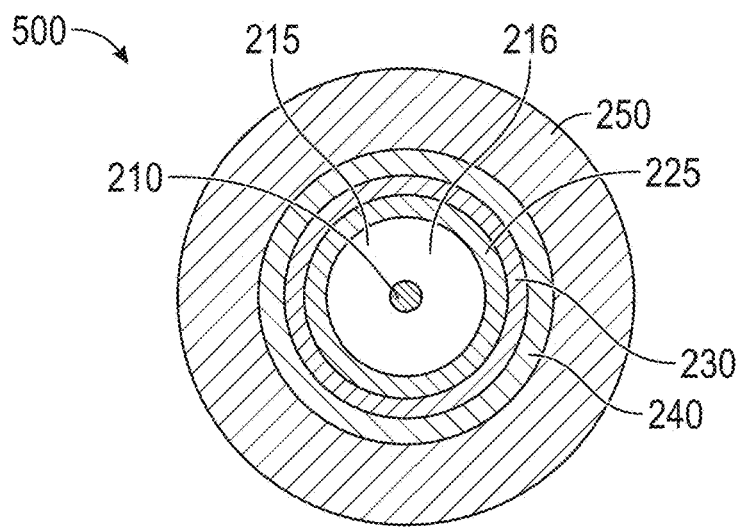
FIG. 5B illustrates a sectional view of one example of an optical fiber optic cable that can be used with the embodiments herein.

FIG. 5B is a cross-sectional view of an exemplary fiber optic cable 500 in a plane perpendicular to a central axis. The fiber optic cable 500 is of a type that may be more specifically referred to as a hybrid cable 500 given the separate optical and electrically conductive pathways that are used for separate optical and electrical signal communication as further described below. The hybrid cable 500 can include at least one optical fiber 210. The hybrid cable 200 may be single mode or multi-mode. Multi-mode optical fibers permit the optical fibers to carry out more than one function, such as carrying out two or more of communication, temperature or pressure sensing whereas single mode may be limited to one of such functions. By use a plurality of optical fibers, if one or more optical fibers become damaged or inoperable, the remaining optical fibers may still be used.

The optical fiber 210 is disposed within an inner core 215. An inner tube 225 is positioned around the inner core 215 so as to surround and contain the contents of the inner core 215. The inner tube 225 may be a metal tube, such as steel, in which case together with the optical fiber 210 it may be referred to in the field as fiber in metal tube (FIMT). The inner core 215 can be filled with a viscous substance 216 to provide protection for the optical fiber 210. The viscous substance 216 may be liquids, gels, foams, or any other material capable of limiting quick or sudden movement within the tube which may damage the optical fibers. An electrical conductor 230 can be positioned circumferentially around the inner tube 225, such that the entire external surface of the inner tube 225 is covered and surrounded by the electrical conductor 230. The electrical conductor 230 may be positioned such that no portion of the electrical conductor 230 overlaps itself as it wraps around the inner tube 225. The electrical conductor 230 may be used to produce or radiate heat when a current is passed therethrough. In some embodiments, the electrical conductor 230 can be completely omitted and only optical light employed without the use of a conducing element. The electrical conductor 230 can be enclosed by an insulation material 240. Positioned around the insulation material 240 is an outer tube 250. The insulation material 240 can be any suitable temperature resistant material capable of withstanding temperatures downhole and may be corrosion resistant. In at least one example, the insulation material 240 can be a polymer such as fluorinated ethylene propylene (FEP) and formed in the shape of tubing. The insulation material 240 can provide protection and spacing between the outer tube 250 and the electrical conductor 230 to prevent contact which may cause a short. The outer tube 250 can be any suitable metal or metal alloy which is capable of grounding electricity and serves as a protective outer layer for the entire cable assembly. A particular metal alloy may include iron or steel, and may be nickel-iron-chromium alloy such as Alloy 825 (UNS designation N08825).

Figure 5C:
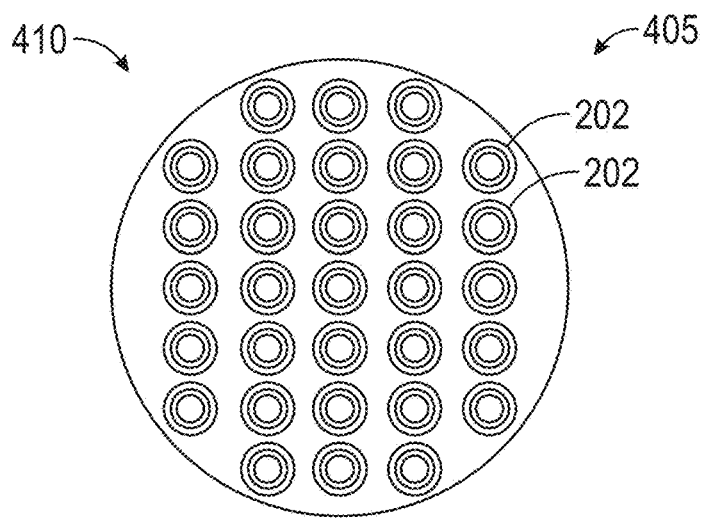
FIG. 5C illustrates a sectional view of one example of a bundle of fiber optic cables that can be used with the embodiments herein.

FIG. 5C illustrates a cross sectional view of a fiber optic cable bundle 20 is shown in FIG. 2. As shown, the bundle 405 can be made up of multiple individual fiber optic cables 202. The fiber optic cables 202 can be either single-mode fibers or multimode fibers, and can be the fiber itself or with outer protective layers. The plurality of fiber optic cables 202 can be the same or different, and may independently differ in diameter, single mode or multimode. A rugged coating 410 may be provided to surrounds the bundle 405 of fiber optic cables 202 and protects them from increasing temperatures and pressures downhole. The coating 410 can be either organic or inorganic material. For example, the coating 410 material can be epoxy, epoxy phenolic, epoxy novolac, silicone, silicone-PFA, carbon, carbon composite, polyimide, multi-polymeric matrix, pressure-sensitive tape (PSA), acrylate, high-temperature acrylate, fluoroacrylate, silicone/acrylate, fluoropolymers, polyether ether ketone (PEEK), polybutylene terephthalate (PBT), polypropylene (PP), polyethylene (PE), polyamide (PA), low smoke zero halogen (LSZH), polyvinyl chloride (PVC), polyvinylidene fluoride (PVDF), Teflon, ceramics, aluminum cadmium, nickel aluminum bronze, nickel-plated aluminum, anodized aluminum, or any other suitable high temperature resistant coating material.

The reaction of the sealant may be activated on demand by various methods, including (1) thermal activation and (2) optical activation. The thermal activation may be carried out by the direct conversion of light into heat. The optical activation may be carried out by photochemical reaction from the release of light by optical fibers. First discussed in the following is thermal activation, followed by optical activation.

Self-heating fiber optic cables may be used for temperature sensing in materials where refractive index changes are too small for detection of materials in optical frequency domain reflectometry (OFDR). In such cases, when the heating power is turned on, the fiber optic cable can be used to accommodate different sensing operations such as cryogen level sensing, fluid flow rates, and gas adsorption rates. This technology may be employed herein for actively heating the environment surrounding the fiber to set a sealant on command.

The fiber optic cable herein may radiate heat or emit light at a temperature, and/or cause the sealant immediately around the fiber optic cable to reach a temperature of at least about 150° F., alternatively at least about 200° F., alternatively at least about 250° F., alternatively at least about 300° F., alternatively at least about 350° F., alternatively at least about 400° F.

Figure 6A:
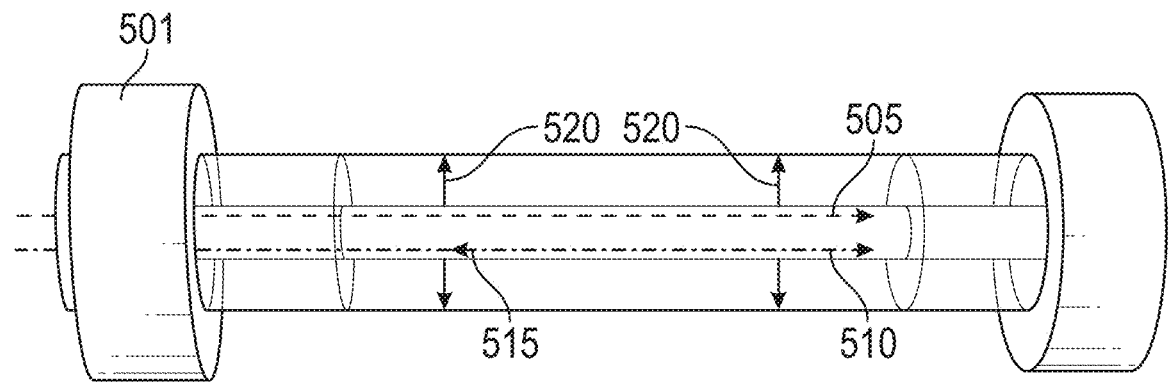
FIGS. 6A and 6B illustrate exemplary heat emitting optical fibers.
Figure 6B:
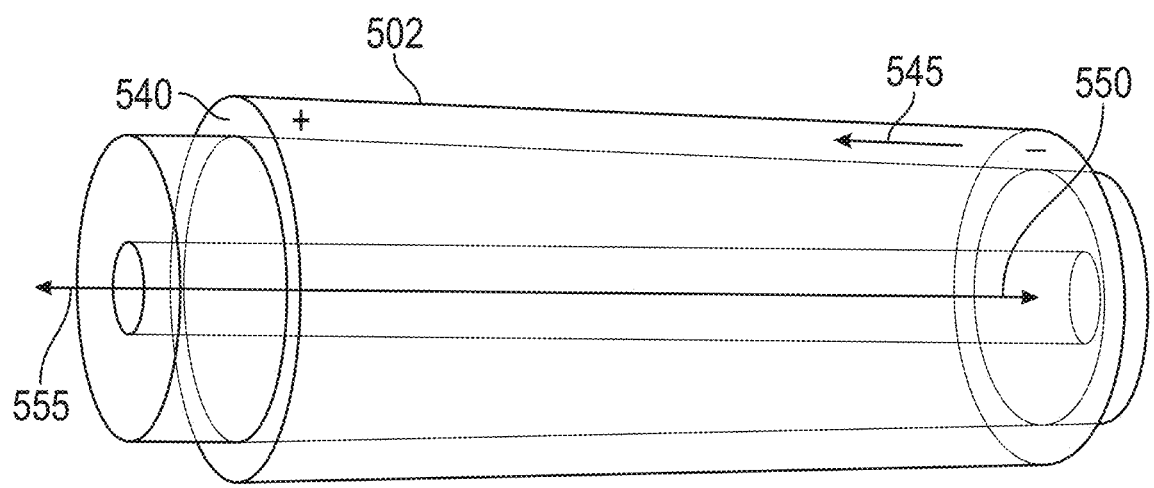

FIGS. 6A and 6B illustrates exemplary heat emitting fiber optic cables. For instance FIG. 6A, optical heating light 505 can be released from an attenuated fiber optic cable 501, in this case a single mode optical fiber, to its surface (and fiber optic cladding), with heat shown by arrows 520. A probe light 510 can also be transmitted with Rayleigh backscatter 515. Alternatively, or additionally, in FIG. 6B, an optical fiber 502 can emit heat by electrical heating. A single mode fiber optic cable 502 may have a metal coating 540. An electrical current 545 can be applied for resistive heat uniformly generated on the optical fiber surface. The optical fiber 502 can also have a probe light 550 can also be transmitted with Rayleigh backscatter 555.

Figure 7A:
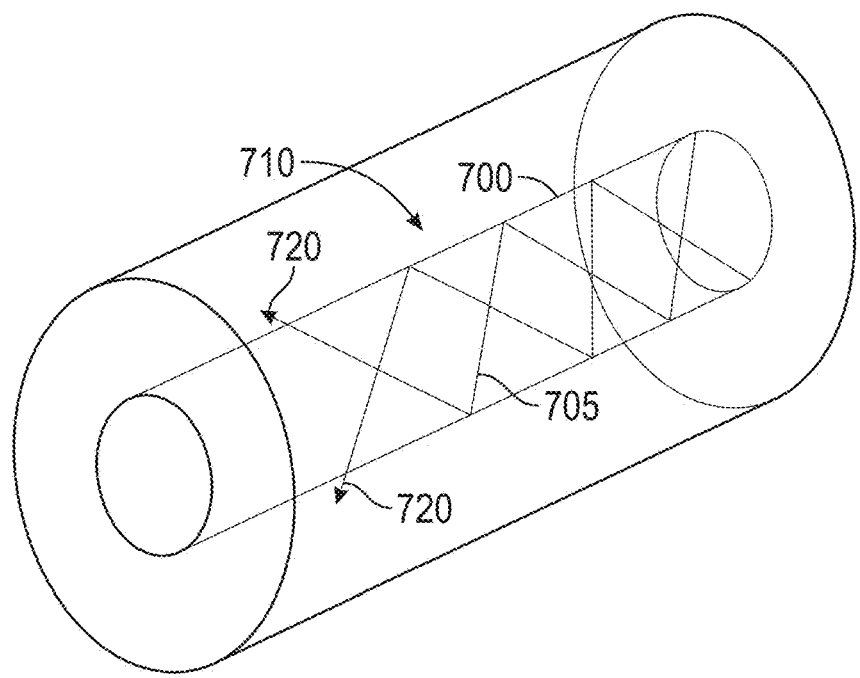
FIG. 7A illustrate exemplary microbends in a fiber optic cable for leakage of light.
Figure 7B:
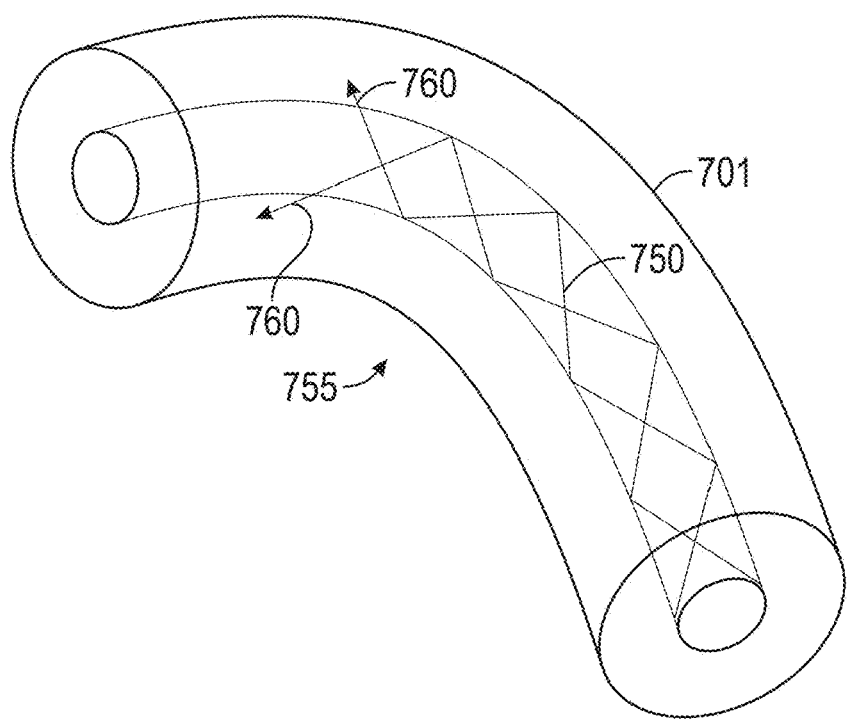
FIG. 7B illustrate exemplary macrobends in a fiber optic cable for leakage of light.

Additionally, optical light can be emitted, or leaked, from the optical fiber. FIGS. 7A and 7B illustrate exemplary variable pitch microbends and macrobends, and "microkinks" that can be introduced to an optical fiber to leak light out from the optical fiber. As shown in FIG. 7A, a fiber optic cable 700 may have light 705 transmitting along its length. A microbend 710 may cause the light 705 to emit out of the fiber optic cable 700 such as at emission 720. The light can then exit and contact the surrounding sealant. As shown in FIG. 7B, a fiber optic cable 701 may have a light 750 transmitting along its length. The fiber optic cable 701 may have a macrobend 755 causing light to emit out of the fiber optic cable 70 such as at emission 760.

Fiber optic cables can be used as a conduit for energy to directly provide heat to a sealant, such as a cement slurry, placed within a wellbore. The fiber optic cable may be made to emit light, also referred to as "leaky" to light, over a specified length of the production casing along which sealant will be set on command through the radial heating out from the optical fiber through the cement. Sections of a fiber optic cable can be manufactured to leak light radially, on demand, through the introduction of micro-kinks (flaws), microbending (R~a) and Macrobending (R>>a), where "R" is the radius of bend curvature and "a" is fiber core radius.

There are a variety of ways to achieve such heating by emitting light. In some embodiments, light can be emitted directly out from the optical fiber into sealant along the length of the fiber. For example a fiber optic cable that includes silica, may emit light through silica from the optical fiber to the sealant. The light would then ultimately be scattered and absorbed by the sealant. The energy from the light may then convert to thermal energy after this series of interactions. In order to enhance light loss at the core-clad boundary of the fiber, dispersed nanoreflectors near the core-to-clad boundary can be employed, for example. Additionally, different forms of optical backscatter, such as Rayleigh backscatter (and all other forms of linear and non-linear backscatter, e.g., Raman and Brillouin), can also be used to augment controlled light leakage from the fiber waveguide along its total length or only along segmented lengths for optical power conservation where high leakage is not required.

Figure 8A:
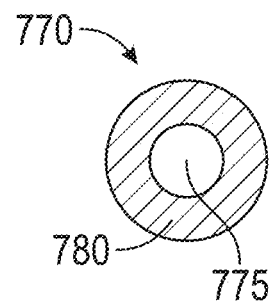
FIG. 8A illustrates an overhead cross-section view of a fiber optic cable having optical fiber and outer protective cable layer.
Figure 8B:
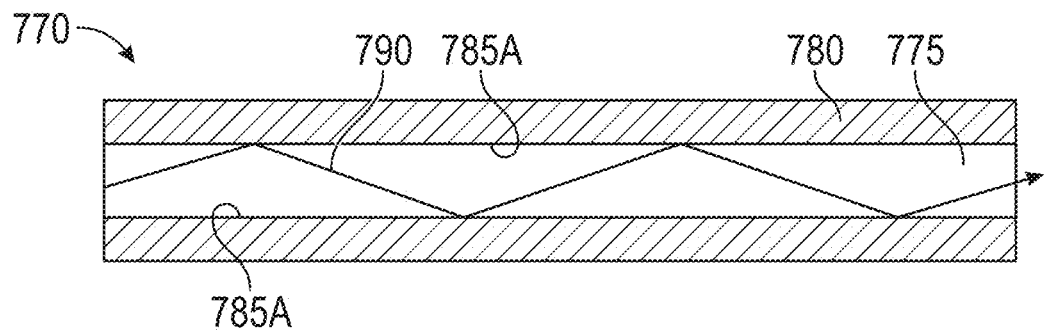
FIG. 8B illustrates the fiber optic cable of FIG. 8A having light transmitting along its length.
Figure 8C:
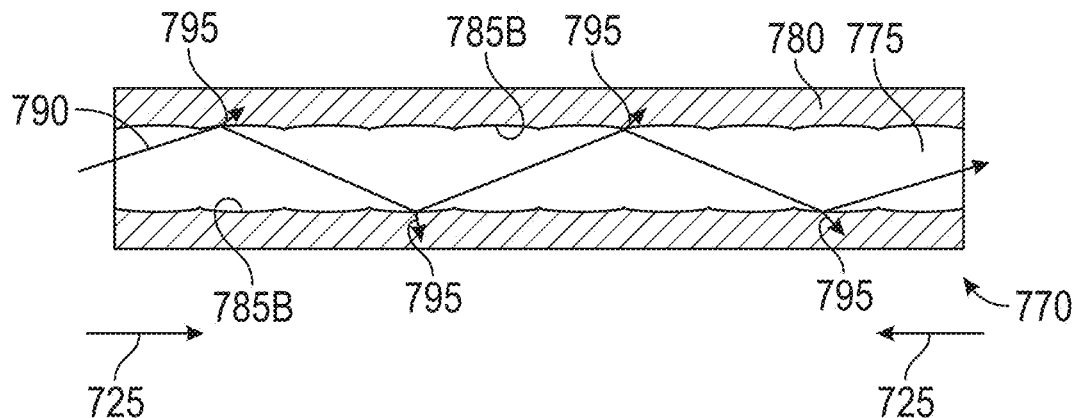
FIG. 8C illustrates exemplary shrinkage of the optical fiber that occurs in response to temperature causing light leakage.

As shown in FIG. 8C, the optical fiber can be programmed to leak light in response to changes in temperature. FIG. 8C illustrates exemplary shrinkage of the fiber optic cable that occurs in response to temperature causing light leakage. The temperature change may be that from the formation or wellbore, as temperatures may increase depth below the earth increases. The temperature change may be from the exothermic reaction of a hydration reaction of the sealant. Additionally, the temperature change may be from heat emitted by the optical fiber.

The microbending in fiber optic cable can be varied through differential thermal expansion. This is a property of particular utility where the setting or cure of the sealant is an exothermic reaction. As the surrounding material undergoes exothermic curing or setting, the rise in temperature from the set can be "sensed" by the optical fiber. In response, the fiber optic cable can restrict the amount of leaked light as the temperature increases. In this way, the fiber optic cable can be considered a self-controlled thermally adaptive material whereby the amount of light leaked from the fiber optic cable can be a function of the degree of curing of the surrounding sealant.

FIG. 8A illustrates an overhead cross-section view of a fiber optic cable 770 having optical fiber 775 and outer protective cable layer 780. As shown in FIG. 8B, the fiber optic cable 770 may have a light 790 transmitting along its length. At a first temperature, such as about room temperature, for example 25° C., the light 790 transmits along the length of the fiber optic cable 770 normally bouncing off the inner surface 785A as it propagates. With a change to a second temperature, such as a lower or higher temperature, a corresponding change is made in the surfaces of the fiber optic cable such that light may be emitted by a change. For instance, as shown in FIG. 8C, the temperature has decreased to −55° C. causing shrinkage indicated by arrows 725. The shrinkage causes microbends in the inner surface 785B. As a result of the microbends, light is emitted from the optical fiber 775 as shown by emissions 795. The efficiency of the process can be optimized through the length of the production casing. Lengths of the production casing at lower temperature where the sealant has not set will be subject to more optical heating than regions of the casing which are higher temperature where more sealant has set (exothermically).

At least one optical fiber can be used for both temperature sensing feedback and power transmission, but it is anticipated that the use of two fibers is advantageous for best closed-loop efficient control of sealant process, such as a cement curing process.

The thermal heat generated by the optical fibers may be used to activate a reaction in the sealant to cause it to set or otherwise cure. This reaction can include an exothermic hydration reaction in cementitious cement and/or polymerization resinous cement.

Where the sealant is a cementitious material, such as Portland cement, the thermal energy from the fiber optic line could be used directly in accelerating the hydration of the cement. Cement hydration, being exothermic, can continue as a propagating wave radially out from the fiber optic energy source to the formation thereby setting the cement as the thermal wave radiates outwards.

Once the heating has taken effect, the sealant can cure or set. In the case of a polymeric sealant, a polymerization can be initiated either through exceeding the activation energy required for setting the materials reactive components or through the combination of a thermal polymerization initiation step. In such thermally induced polymerizations, there is a wide variety of suitable initiators, where some examples include benzoyl peroxides, potassium persulfate, 2,2'-azobis(2-methylpropionitirile), and 4,4'-azobis(4-cyanovaleric acid). Examples of the possible monomeric starting materials for the sealants are acrylamides, epoxy resin-based systems, phenolic resin systems, etc.

In either case of cementitious or resinous cement, the temperature release to cause the thermal reaction may be controlled. For instance, a controlled release of an accelerator. The accelerator may be released through the liberation of an encapsulated accelerator from a vesicle, liposome, colloidosome, stabilized emulsion polymer, or other encapsulating material. Otherwise it could be released from a fragmentation reaction from a larger molecule or the in situ generation of an accelerating component from another component in the cement of different functionality.

Another mechanism for the setting of cement on command with a thermal stimulus can include the deactivation or a retarding additive. This can occur through the reversible or irreversible disruption of the retarding material. The retarder can be designed to disintegrate otherwise degrade in response to a change in temperature. For instance, peroxide derivatives released in a cement slurry can be activated to oxidize a retarder such as sucrose. Other instances can require retarders that are specially designed to fragment in direct response to a thermal stimulus without the mediation of a radical initiator such as a peroxide.

Setting from the Bottom of the Well Up

In some embodiments, the curing or setting of sealant, such as cement, maybe conducted or propagated along the casing from the bottom of the wellbore along its length to the surface of the earth. The fiber optic cables may be manipulated to cause this activation of the reaction of the sealant from the bottom of the wellbore up, which may include 1. Stepwise or gradient increase in macrobending pitch; 2. Stepwise or gradient increase in microbending; 3. Upconversion and amplification of shorter wavelength(s) light toward the bottom of the wellbore; and 4. Stepwise or gradient spectral line absorption of dopants in the fiber optic cable. These are discussed in turn as follows:

1. Stepwise or Gradient Increase in Macrobending Pitch

The pitch angle of the macrobending of the fiber optic cable may be varied. The change in pitch angle of fiber macrobending can be realized as a gradient or a stepwise change. The regions of the fiber with higher macrobending pitch will leak more light to the sealant than those regions with lower pitch. Accordingly, the higher macrobending pitch can be applied in the regions toward the bottom of the wellbore, and decrease toward the surface. This results in more heating towards the bottom of the well than towards the top. As a result, sealant would harden or set first at or toward the bottom of the well and progress upward to the top of the wellbore.

2. Stepwise or Gradient Increase in Microbending

The fiber optic cable present at the bottom of a wellbore may be provided with a higher density of microbending per unit length than fiber toward or at the top of the production casing. The change in density of microbending can be realized as a gradient or a stepwise change. The regions of the fiber with higher microbending densities will leak more light to the cement than those regions with lower microbending densities. Accordingly, the higher microbending pitch can be applied in the regions toward the bottom of the wellbore, and decrease toward the surface. This results in more heating towards the bottom of the well than towards the top. As a result, sealant would harden or set first at or toward the bottom of the well and progress upward to the top of the wellbore.

3. Upconversion and Amplification of Shorter Wavelengths

Raleigh backscattering is a dominant mechanism for light leakage at 1 micron wavelength light. Rayleigh backscattering is less at longer wavelengths (i.e. 1.5-1.6 micron wavelength light). Light Wavelengths of 1.5-1.6 micron may be used to lower Rayleigh loss at longer distances towards the top of the fiber. Towards the bottom of the fiber, rare-earth dopants can be added to the fiber to upconvert and amplify the light at shorter wavelength (i.e. 1 micron wavelength) which would give higher Raleigh backscattering losses. In this way, the fiber optic cable is rendered leakier to light at the bottom of the well, and less so toward the top of the well. As a result, sealant would harden or set first at or toward the bottom of the well and progress upward to the top of the wellbore.

4. Stepwise or Gradient Spectral Line Absorption of Dopants in the Fiber Optic Cable The fiber optic cable can be doped regionally with such species as $H_2$ or hydroxyl radicals. The dopant can be grade loaded or stepwise loaded into the fiber optic line. The spectral line absorption by these species can be used to regionally enhance heat transfer to the sealant. The regions at or near the bottom of the wellbore can doped so as to provide more light emission, and then progressively decrease toward the top of the wellbore. As a result, sealant would harden or set first at or toward the bottom of the well and progress upward to the top of the wellbore.

Radial Heat Transfer Efficiency

The efficiency of the radial heat transfer from the fiber optic cable to the sealant or cement may be increased by various methods, including 1. Plasmonic conversion, and 2. Carbon nanotubes in the sealant.

1. Plasmonic Conversion

The optical light transmitted along the length of the fiber optic cable can be converted to terahertz frequency for emission radially into the surrounding sealant. This frequency of light can have a higher transmissibility in sealant enabling the energy to be radiantly transmitted further into the sealant. In order to do this conversion of infrared light to terahertz radiation, the fiber optic cable may be coated with a material capable of plasmonic terahertz emission. Exemplary materials which may be used for plasmonic terahertz emission include, but are not limited to gold nanospheres, graphene, nanotubes, and carbon black. These materials can be graded such that the lowest concentration is at the top of the fiber and the highest concentration is at the bottom of the fiber. As a result, sealant would harden or set first at or toward the bottom of the well and progress upward to the top of the wellbore.

2. Carbon Nanotubes as Thermal Conductors in the Sealant

Carbon nanotubes may be used to enhance the heat transfer due to their high thermal conductivity along their axis. The thermal conductivity of a carbon nanotube along the axis can be about ten times higher than that of copper. This assists in conducting the heat away from the area close to where it is generated and to other sections of a sealant to be cured, such as a cemented annulus.

Nanotube material which is heavily covalently functionalized conducts heat less efficiently than "pristine" nanotube material. Covalent functionality can be stripped off of the nanotube surface after the nanotube material heated in certain mildly oxidative environments. The thermal conductivity of the nanotube material can be made dynamic and responsive to heat flux. When the environment surrounding a covalently functionalized (thermally insulating) nanotube reaches a certain temperature, the functional groups covalently attached to the surface of the nanotube are removed and the high conductivity of the "pristine" nanotube material is restored. The heat is then conducted away to the region of the nanotube fiber which has not reached the temperature required for defunctionalization. In this way heat can be conducted away from the fiber optic cable, radially out to the wellbore.

The sealant reaction may be activated by optical activation, in particular with resinous sealant. Accordingly, photochemical activation of the sealant can include a photoinitiation step. This may be carried out by exposing photoinitiators to light from the optical fiber. The photoinitiators may activate when exposed to UV or visible light. When activated he photoinitiators initiate a polymerization of monomers, polymers, or resins in the sealant causing the sealant to cure.

Figure 9:
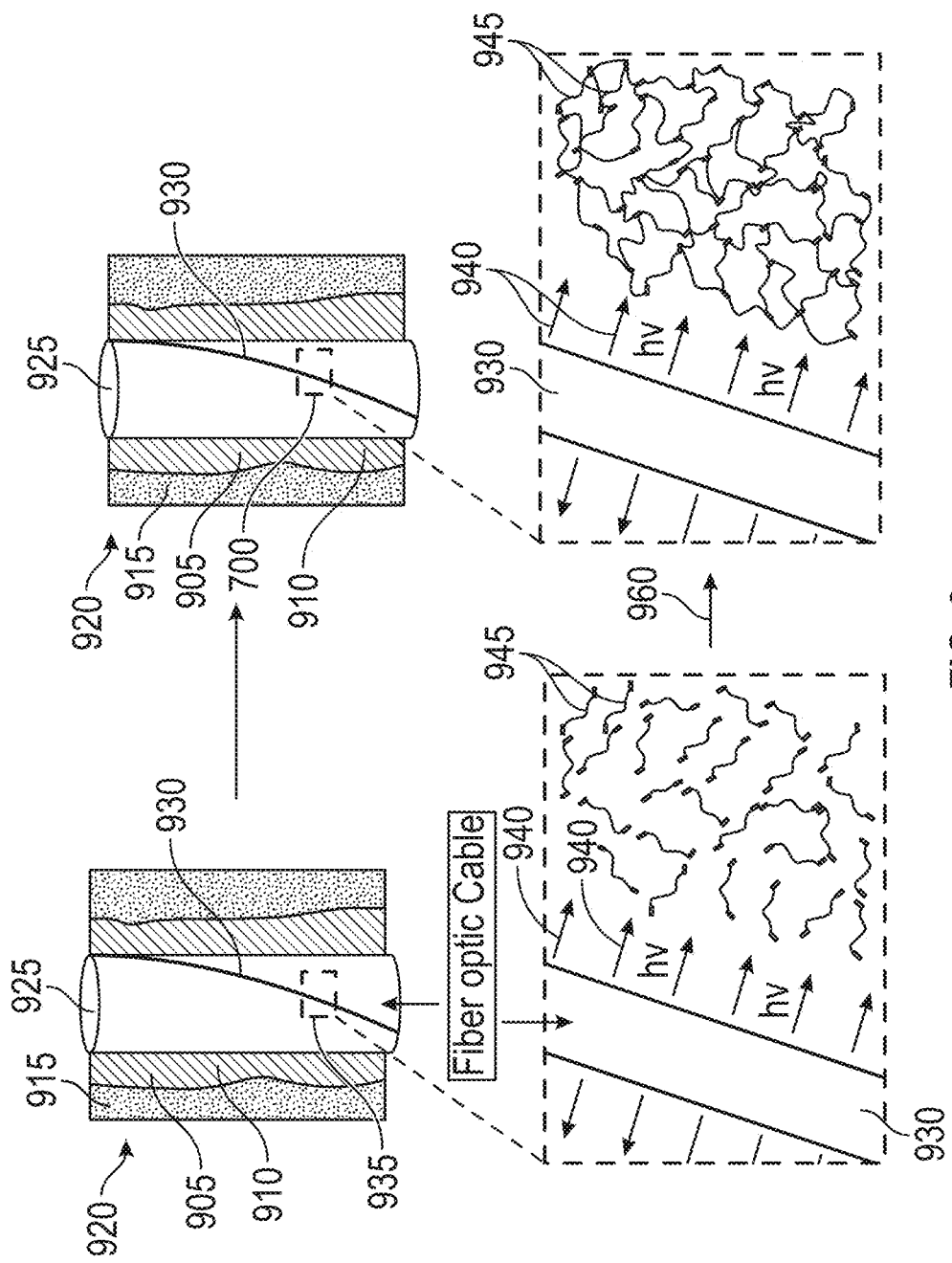
FIG. 9 illustrates an exemplary setting of a sealant through the direct conversion of light energy into chemical energy.

FIG. 9 illustrates a sealant that is set through the direct conversion of light energy into chemical energy. In FIG. 9, a sealant 905, such as cement, has been placed within an annulus 910 between the surface 915 of a wellbore 920 and a casing 925. A fiber optic cable 930 having one or more optical fibers is within the sealant 905 and in this case wrapped around the casing 925 in helical fashion. Although shown as wrapped in helical fashion it may be placed in any arrangement, such as straight, or touching or spaced from the casing 925, and may include a plurality of fiber optic cables 930.

A section of the fiber optic cable 930 is enlarged 935 to show light emitting from the fiber optic cable 930, as photons hv, to the surrounding sealant 905 having polymers 945. After the photoinitiators have been exposed in the sealant, as shown by the arrow 960 pointing to the right side of the FIG. 9, the polymers 945 have cross cross-linked and the sealant 905 hardens.

Photochemical activation of the sealant can require a photoinitiation step. Photoinitiators can come from a wide variety of different kinds of materials. Common suitable photoinitiators include acetophenones, benzoins, benzophenones, thioxanthones, and cationic photoinitiators such as triphenylsulfonium triflate. Many common photoinitiators are active when exposed to UV. However, visible light can also be used for photoinitiation. Examples of such initiators are thioxanthone-anthracene or riboflavin-5'-phosphate, sodium salt for visible-light photoinitiation. Azo initiators, such as 2,2'-azobisisobutyronitrile, can be used as photoinitiators. Azo compounds may also function as thermal initiators. With the proper selection of azo compound, a sealant with a long induction period at BHST may be photochemically activated with UV light. Any nonirradiated sealant would eventually set through slow thermal degradation of the azo compound. In order to get better penetration through aqueous solutions, near-IR light may be used as a photon source.

In order to obtain better penetration through aqueous solutions, near-infrared (near-IR or NIR) light may be employed as a photon source. Accordingly, if UV/Visible photon mechanics are required, then it is possible to upconvert mid-NIR into broad spectrum visible and UV light via supercontinuum conversion within the optical fiber.

In some embodiments, UV/visible light may be produced via a "fiber fuse" for exposure to a surrounding sealant. A fiber fuse is a special case of a super high power operating regime of over-power, which exceeds the silica damage threshold limited optical transmission of a fiber optic cable having silica in its jacket. As a result, a one-shot runaway "glass crazing" condition is generated at the distal end of the fiber and proceeds to the proximal end. With sufficient optical power density present in a fiber, the probability of fiber fusing goes to 1, whereby the damage location (starting from the distal end) propagates back towards the laser source at about 1 m/second, while emitting excess broadband optical energy and heat energy from the moving crazed-glass end. Accordingly, using a fiber fuse, the distal end of a fiber optic cable could be placed toward the bottom of the wellbore, such that the fuse propagates from the bottom of the wellbore to the top. As a result, sealant would cure or set first at or toward the bottom of the well and progress upward to the top of the wellbore.

Near-IR Light Photoinitiators

In some embodiments, NIR photoinitiation may be employed to cause a polymerization reaction within the sealant so that it sets and hardens. In some embodiments, two-photon absorption may be used to induce polymerization, and certain compounds may be used for two-photon absorption. Furthermore, near IR photoinitiation is possible. It has been determined that when two photon absorption is the subject, a photoinitiation wavelength as long as 1.06 µm is possible. One such two photon absorbing initiator which initiates at 1.06 μm is (E,E,E,E,E,E)-1,13-bis-[4-(diethylamino)phenyl]-trideca-1,3,5,6,8,10,12-hexaen-7-one, shown as follows:

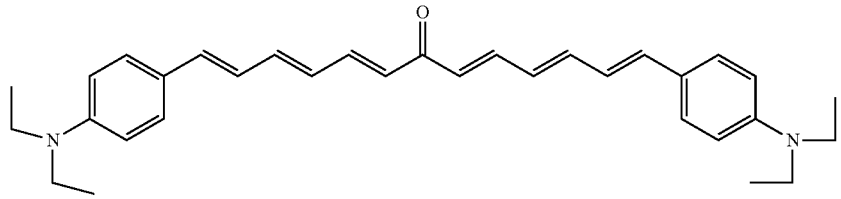 [SMILES: CCN(CC)c1ccc(/C=C/C=C/C=C/C(=O)/C=C/C=C/C=C/c2ccc(N(CC)CC)cc2)cc1]

In other embodiments, other symmetrical conjugated ketones may be employed which are bisubstituted with amino substituted phenyls. For instance, the length of the alkenyl bridge hydrocarbon bridge making up the ketone between the phenyl end groups may vary from the alkenyl hydrocarbon bridge may be varied from 10 to 20 carbons, alternative from 12 to 15, and may be 13 carbons in length, which may be unsaturated, substituted or unsubstituted with other functional groups.

Figure 10:
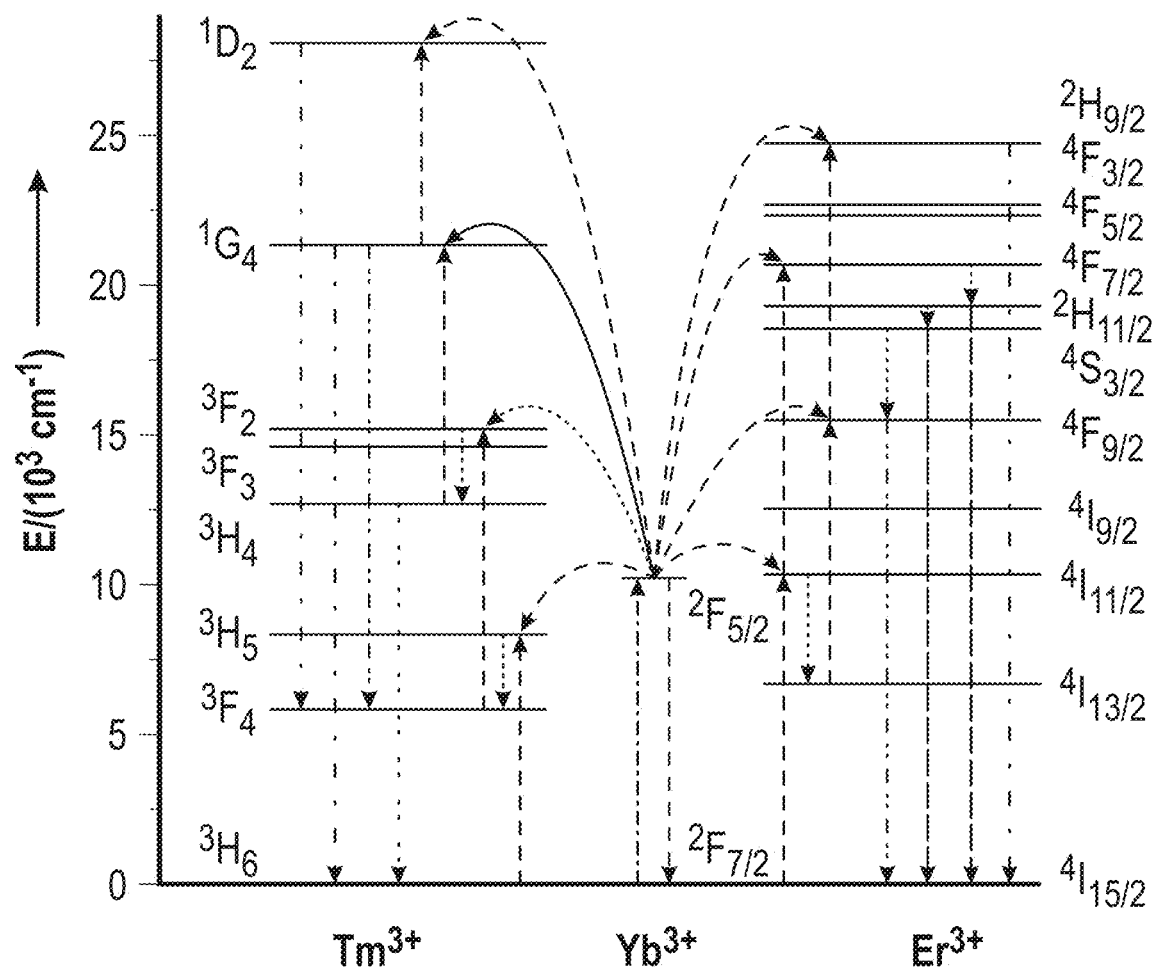
FIG. 10 illustrates a mechanism for upconversion with $Er^{3+}$—$Yb^{3+}$ and $Tm^{3+}$—$Yb^{3+}$ couples.

Although IR or NIR may often be the wavelength transmitted through the fiber optic cable, the vast majority of photoinitiators, however, require UV or visible light. Accordingly, if such photoinitiator is used, then the fiber optic light, which may be transmitted down the optical fiber as infrared light, must be upconverted to visible or UV The laser light required for transit through the fiber may be of relatively long wavelength (i.e., ≥980 nm) due to the physical limitations for the fiber optic line. Upconversion processes are possible when infrared or near-infrared light irradiates certain lanthanides. Lanthonides may be employed to convert IR or NIR to UV or visible light. In particular, some common in trivalent lanthanide ions with metastable and long-lived intermediate levels act as storage reservoirs for pump energy. FIG. 10 illustrates a mechanism for upconversion with $Er^{3+}$—$Yb^{3+}$ and $Tm^{3+}$—$Yb^{3+}$ couples. A particular upconversion system is that shown in FIG. $Er^{3+}$—$Yb^{3+}$ couple. Bulk $NaYF_4$: $Er^{3+}$, $Yb^{3+}$ and $NaYF_4$: $Er^{3+}$ have the highest upconversion yields under monochromatic irradiation at 975 nm and 1522 nm NIR light (5% and 3%, respectively).

Figure 11:
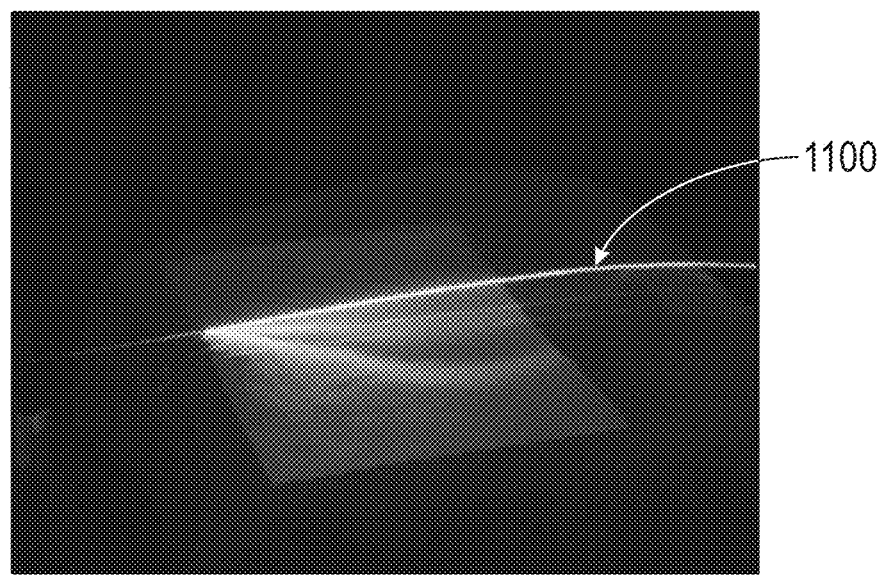
FIG. 11 illustrates visible light emitting from an optical fiber through upconversion of 980 nm light.

FIG. 11 illustrates visible light emitting from a fiber optic cable 1100 through upconversion of 980 nm light. Upconverters are incorporated into light-emitting optical fibers. An optical fiber with a glass or silica multimode core can be cladded with an optically clear polymer (such as phosphorylated polymethylmethacrylate) containing lanthanium-based upconverters (such as 20 μm sized 2% Er, Yb $NaYF_4$ particles). Fibers with a core diameter of 125 μm and a coated diameter of 244 μm can be created where the cladding serves as the fiber coating. The total internal reflection in the core of the fiber is negated so that light can leak out of the fiber and upconvert to higher energy in the process.

Figure 12:
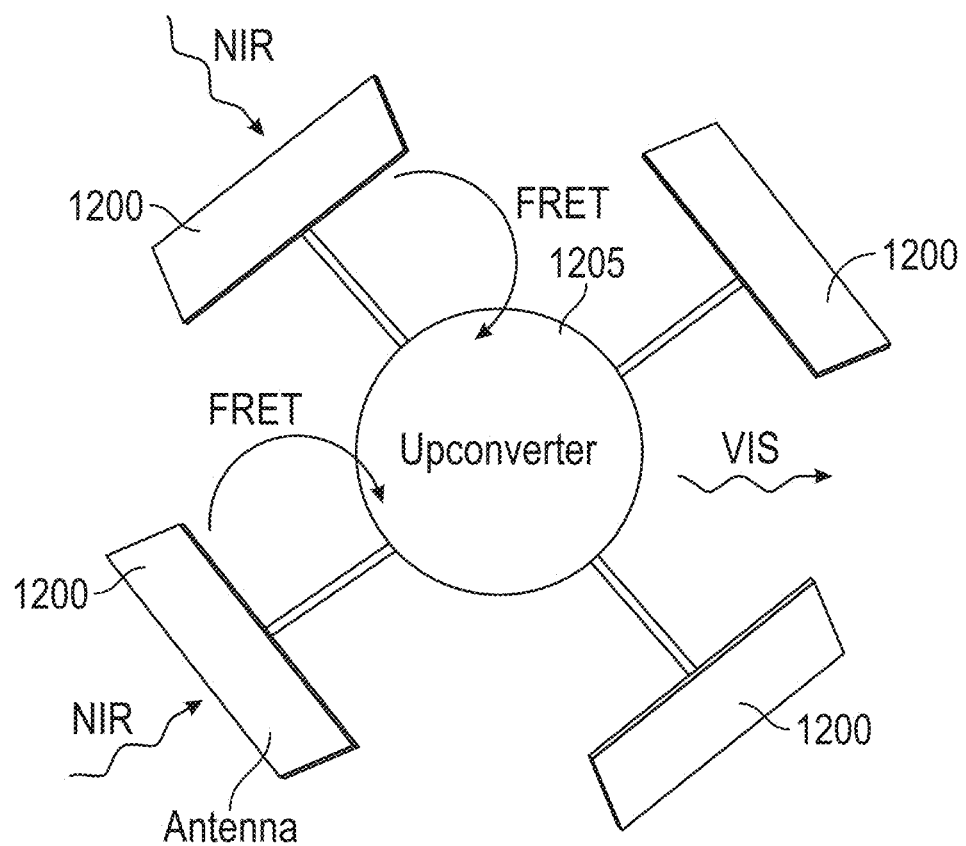
FIG. 12 illustrates one example of upconversion using antenna dyes which absorb near-IR (NIR) energy and transfer the energy to an upconverter.

Some upconverters may require a boost in efficiency. One method to increase the efficiency of up-conversion is through dye-sensitization of the upconverter. In such cases, an organic near-IR dye can be used to capture near-IR light and transfer the energy to an upconverter. Suitable upconverters include β-$NaYF_4$:Yb,Er nanoparticles. This kind of coupling may render over 3,000 times stronger light emission as compared with the non-sensitized version. FIG. 12 illustrates one example of upconversion using antenna dyes 1200 which absorb near-IR (NIR) energy and transfer the energy to an upconverter 1205. This is a two-photon process whereby two Near-IR photons are effectively summed via fluorescence resonance energy transfer (FRET) to produce emission of one higher-energy, visible-light photon.

Photochemical Degradation of Retarder in Sealant

Retarders may be provided in the sealant which may be degraded by light from the optical fiber. The retarders may slow or prevent the sealant from curing as it would without such retarders. Accordingly, degradation of the retarder permit the sealant to then cure. Accordingly, activation of a reaction in the sealant includes degradation of retarded in the sealant. In some embodiments, a at least a portion of a fiber optic cable could be coated with an oxidation agent. The oxidation agent upon contact with the light itself degrade into, or otherwise emit compounds, ions or radicals which oxidize and degrade the retarders. The oxidation agent may depend on the type and chemistry of the retarder. Exemplary retarders include saccharides, including disaccharides and polysaccharides, including sucrose, glucose, fructose, and other sugars. Oxidizing agents include compounds which produce hydroxyl radicals when irradiated in water, or produce oxidation species, or otherwise undergo photocatalytic oxidation to release species which oxidize the retarders. Exemplary oxidation agents include $TiO_2$. Accordingly, the fiber optic cable may include $TiO_2$ its jacket or other layers surrounding the fiber optic cable, such that light may contact the $TiO_2$ which emit species which oxidize the retarders such as saccharides, such as sucrose.

Figure 13:
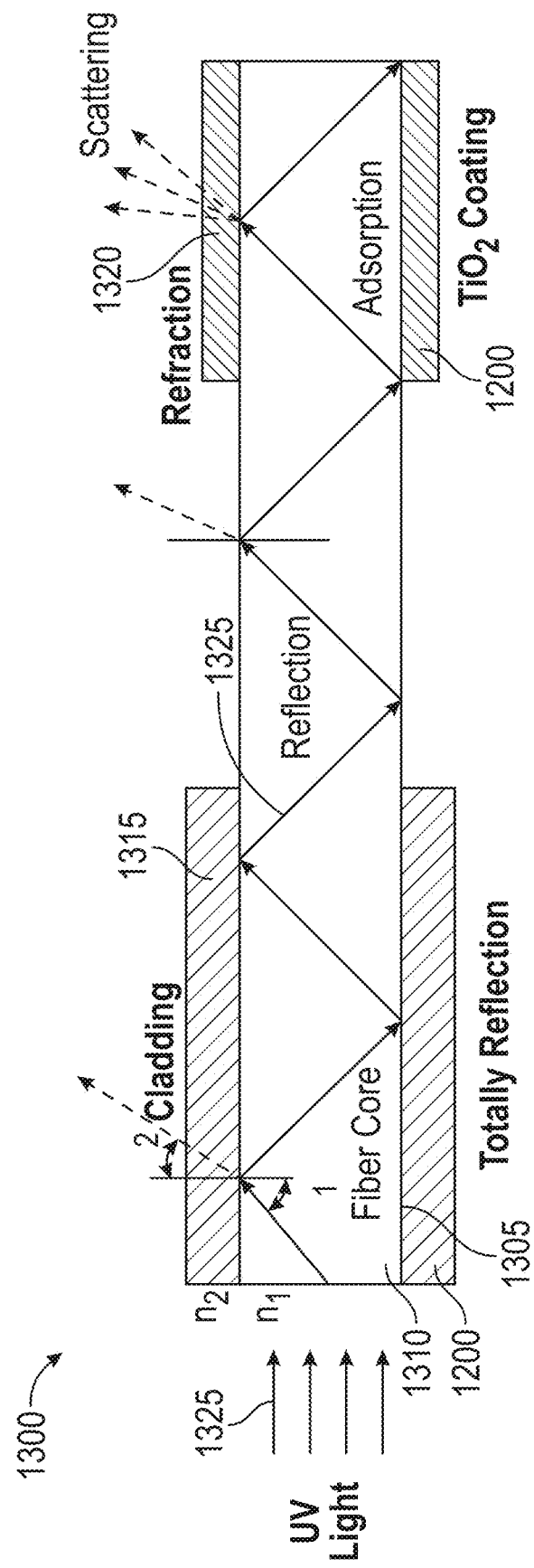
FIG. 13 illustrates light transmission and distribution in a fiber optic cable coated with a $TiO_2$ layer.

A FIG. 13 illustrates light transmission and distribution in a fiber optic cable 1300 having an optical fiber 1305 coated with an oxidation agent, in this case $TiO_2$ layer 1320, which may be made up of entirely or partially of $TiO_2$, or include particles of $TiO_2$. In the case of set-on-command, $TiO_2$, can cause the oxidation of a retarding species in a surrounding sealant. For instance, sucrose may be employed as a cement set retarder. Sucrose may be oxidized by the photocatlytic oxidation of $TiO_2$. In this way, a retarder may be degraded or destroyed. Therefore, as disclosed herein, light may be used to generate radical species as opposed to heat as described previously. As show in FIG. 13, the optical fiber 1305 may include a cladding portion 1315 without $TiO_2$. As UV light 1325 passes within the core 1310, and reflects off the walls of the core. Asit contacts the $TiO_2$ layer 1320, oxidizing species are emitted to contact retarders in the surrounding sealant and degrade or destroy such retarders, thereby causing the sealant to set or cure.

As used herein, a sealant may include any cement and/or any kind of material capable of being pumped to flow to a desired location, and capable of setting into a solid mass at the desired location. In many cases, common calcium-silicate hydraulic cement is suitable, such as Portland cement. Calcium-silicate hydraulic cement includes a source of calcium oxide such as burnt limestone, a source of silicon dioxide such as burnt clay, and various amounts of additives such as sand, pozzolan, diatomaceous earth, iron pyrite, alumina, and calcium sulfate. In some cases, the sealant may include polymer, resin, or latex, either as an additive or as the major constituent of the cement. The polymer may include polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, silicones, and combinations thereof. The sealant may also include reinforcing fillers such as fiberglass, ceramic fiber, or polymer fiber. The sealant may also include additives for improving or changing the properties of the cement, such as set accelerators, set retarders, defoamers, fluid loss agents, weighting materials, dispersants, density-reducing agents, formation conditioning agents, lost circulation materials, thixotropic agents, suspension aids, or combinations thereof.

The following are example embodiments that are within the scope of this disclosure. Other, different and/or broader embodiments are also within the scope of this disclosure, some of which may include elements of one example embodiment combined with elements of another example embodiment (to the extent combinable), or subsets of elements of one specific example embodiment.

DTS System

Regarding the sensing capabilities and sensor types contemplated in the present disclosure, the sensors may include fiber optic cables cemented in place in the annular space between the casing and formation. The fiber optic cables may be clamped to the outside of the casing during the deployment, and protected by centralizers and cross coupling clamps. Other types of permanent sensors may include surface and down-hole pressure sensors, where the pressure sensors may be capable of collecting data at rates up to 2,000 Hz or even higher.

The fiber optic cables may house one or several optical fibers, and the optical fibers may be single mode fibers, multi-mode fibers or a combination of single mode and multi-mode optical fibers.

The fiber optic sensing systems may operate using various sensing principles for determination of temperature including Raman scattering, Brillouin scattering, Coherent Rayleigh backscatter, and/or a combination of aforementioned with Enhanced or Engineered fibers. Raman backscattering (which is due to thermally excited molecular vibration known as optical phonons) may have an intensity which varies with temperature, whereas Brillouin backscattering (which is due to thermal excited acoustic waves known as acoustic phonons) has a wavelength which varies with both temperature and strain, and so may be employed herein to detect temperature. Rayleigh backscattering measures changes in optical path length where the change in optical path length can be induced by temperature or strain where strain can be mechanical pull on the fiber or acoustic vibration. Fiber Bragg Grating (FBG) based systems may also be employed. Bragg grating can be used to detect strain and a change in optical path length along the optical fiber. Since a change in temperature will also cause a change in optical path length along the fiber optic cable, the Bragg grating can also, or alternatively, be used as a temperature sensor to sense temperature along the waveguide. Bragg gratings may be spaced out along the fiber optic cable, then a temperature profile along the fiber optic cable can be detected using the Bragg gratings. In the case of Enhanced backscattering in optical fibers, the fiber itself is engineered to possess reflection enhancing features along its length that offer greater signal strength compared with intrinsic Rayleigh backscatter alone. Such internal features may include Fiber Bragg Gratings and/or microstructures within the glass fiber core. Raman, Rayleigh, Brillouin, and FBG based measurements all have temperature responses and can be used for monitoring cement along a wellbore in slurry or hardened form. Raman, Brillouin and FBG can measure absolute temperature and changes over time.

Various hybrid approaches where single point or quasi-distributed or distributed fiber optic sensors are mixed with e.g. electrical sensors are also anticipated. The fiber optic cable may then include optical fiber and electrical conductors.

Control Unit

Figure 14:
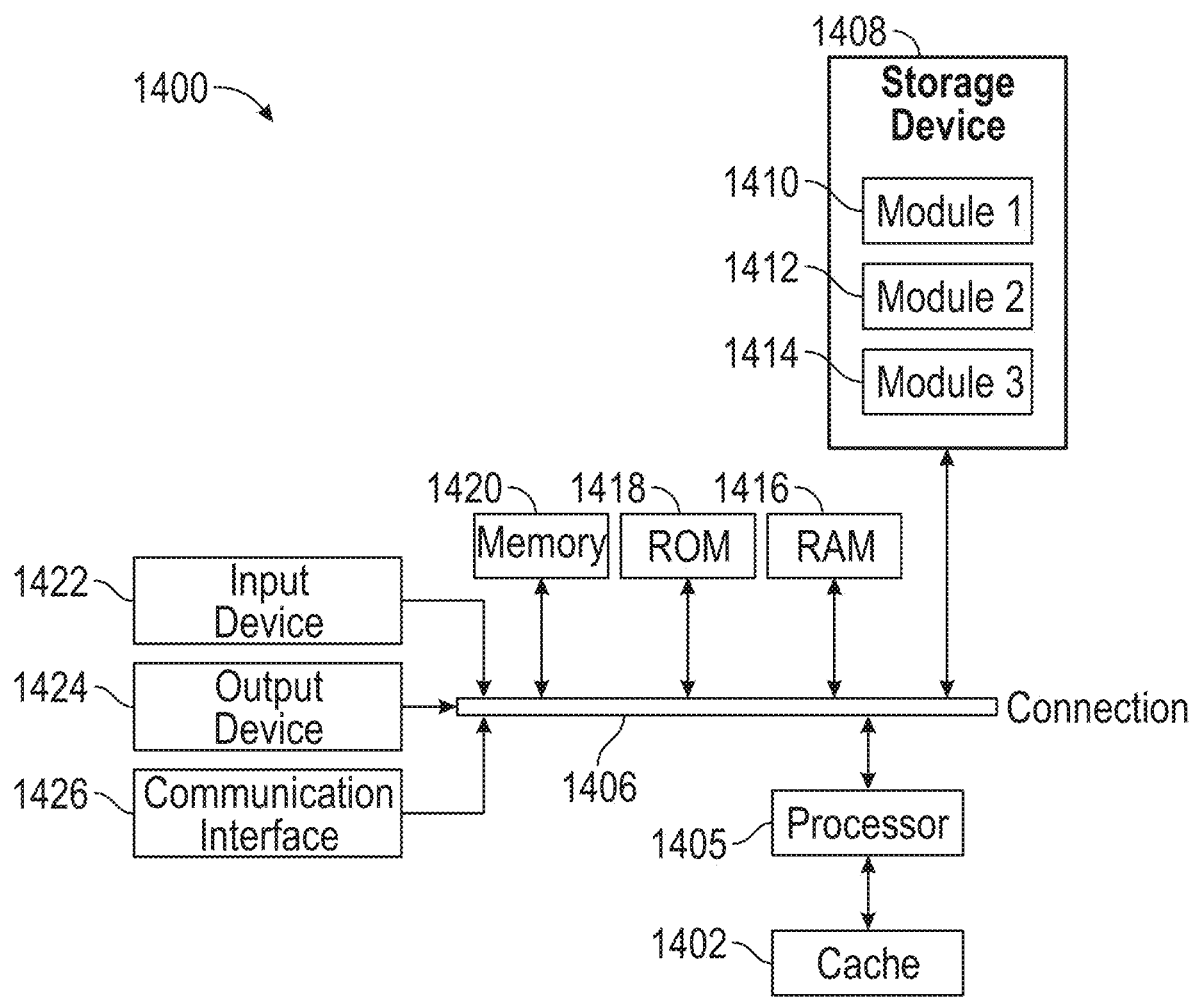
FIG. 14 is a schematic diagram of an example control unit for implementation with the present disclosure.

FIG. 14 illustrates system architecture 1400 which may be the control unit 128 of FIG. 1A-3, in order to interact with the DTS system including the transmission and receipt of optical signal, as well as carrying out the processing and controlling the emission of heat or light for activating a reaction of the sealant. As illustrated, the components of the system may be in electrical communication with each other using a bus 1406. System architecture 1400 can include a processing unit (CPU or processor) 1405, as well as a cache 1402, that are variously coupled to system bus 1406. Bus 1406 couples various system components including system memory 1420, (e.g., read only memory (ROM) 1418 and random access memory (RAM) 1416), to processor 1405. System architecture 1400 can include a cache of high-speed memory connected directly with, in close proximity to, or integrated as part of the processor 1405. System architecture 1400 can copy data from the memory 1420 and/or the storage device 1408 to the cache 1402 for quick access by the processor 1405. In this way, the cache can provide a performance boost that avoids processor 1405 delays while waiting for data. These and other modules can control or be configured to control the processor 1405 to perform various actions. Other system memory 1420 may be available for use as well. Memory 1420 can include multiple different types of memory with different performance characteristics. Processor 1405 can include any general-purpose processor and a hardware module or software module, such as module 1 (1410), module 2 (1412), and module 3 (1414) stored in storage device 1408, configured to control processor 1405 as well as a special-purpose processor where software instructions are incorporated into the actual processor design. Processor 1405 may essentially be a completely self-contained computing system, containing multiple cores or processors, a bus, memory controller, cache, etc. A multi-core processor may be symmetric or asymmetric.

To enable user interaction with the computing system architecture 1400, input device 1422 can represent any number of input mechanisms, such as a microphone for speech, a touch-sensitive screen for gesture or graphical input, keyboard, mouse, motion input, and so forth. An output device 1424 can also be one or more of a number of output mechanisms. In some instances, multimodal systems can enable a user to provide multiple types of input to communicate with the computing system architecture 1400. The communications interface 1426 can generally govern and manage the user input and system output. There is no restriction on operating on any particular hardware arrangement and therefore the basic features here may easily be substituted for improved hardware or firmware arrangements as they are developed.

Storage device 1408 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1416, read only memory (ROM) 1418, and hybrids thereof.

Storage device 1408 can include software modules 1410, 1412, 1414 for controlling the processor 1405. Other hardware or software modules are contemplated. The storage device 1408 can be connected to the system bus 1406. In one aspect, a hardware module that performs a particular function can include the software component stored in a computer-readable medium in connection with the necessary hardware components, such as the processor 1405, bus 1406, output device 1424, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Various examples are provided herein to enhance understanding of the present disclosure. A specific set of statements are provided as follows:

Statement 1. A method comprising: arranging a sealant and a fiber optic cable proximate one another within a wellbore, the fiber optic cable having one or more optical fibers; activating a reaction of the sealant by the fiber optic cable resulting in curing of the sealant.

Statement 2. The method of statement 1, wherein the sealant is located in an annulus between a casing and an inner surface of a wellbore.

Statement 3. The method of statements 1 or 2, wherein the activation of the reaction occurs from light released from the fiber optic cable.

Statement 4. The method of any one of the preceding statements 1-3 wherein the activation is a thermal initiation by the fiber optic cable.

Statement 5. The method of any one of the preceding statements 1-4, wherein the fiber optic cable begins the activation of the reaction at a downhole portion of the sealant and continues in an uphole direction.

Statement 6. The method of any one of the preceding statements 1-5, wherein the fiber optic cable heats at a temperature of at least 200° F.

Statement 7. The method of any one of the preceding statements 1-6, wherein light is released from the fiber optic cable by micro-bends or macro-bends in the fiber optic cable.

Statement 8. The method of any one of the preceding statements 1-6, wherein light is released from the fiber optic cable by shrinkage of the optical fiber.

Statement 9. The method of any one of the preceding statements 1-8, wherein the reaction is a hydration reaction of the sealant.

Statement 10. The method of any one of the preceding statements 1-9, wherein the sealant is cement.

Statement 11. The method of any one of the preceding statements 1-10, wherein the sealant is resinous.

Statement 12. The method of any one of the preceding statements 1-11, wherein the activation is an optical initiation from the fiber optic cable.

Statement 13. The method of any one of the preceding statements 1-12, wherein the reaction is a photochemical reaction.

Statement 14. The method of statement 13, wherein the photochemical reaction is activated by light released from the fiber optic cable and contacting a photoinitiator.

Statement 15. The method of statement 13 or 14, wherein the photoinitiator is a member selected from the group of acetophenones, benozoins, benzophenones, thioxanthones, cationic photoinitiators, compounds with triphenylsulfononium ions, azo compounds, flavins, sodium salts and mixtures thereof.

Statement 16. The method of any one of the preceding statements 1-15, wherein the photoinitiator reacts in the presence of ultra-violet or visible light.

Statement 17. The method of any one of the preceding statements 1-16 wherein light from the fiber optic cable is upconverted from infrared or near-infrared to ultra violet or visible light.

Statement 18. The method of statement 17, wherein the light is upconverted via upconverters, the upconverters comprising lanthanides or rare-earth elements.

Statement 19. The method of any one of the preceding statements 1-18, wherein the fiber optic cable emits light via a fiber fuse.

Statement 20. The method of any one of the preceding statements 1-19, wherein the reaction is the degradation of a retardant within the sealant.

Statement 21. A system comprising: a fiber optic cable disposed within a sealant arranged within an annulus between annulus between a casing and an inner surface of a wellbore, the fiber optic cable configured to activate a reaction of the sealant resulting in curing of the sealant.

Statement 22. The system of statement 21, wherein the activation of the reaction is by optical or thermal initiation by the fiber optic cable.

What is claimed is:

1. A method comprising:
   arranging a sealant and a fiber optic cable proximate one another along a casing within a wellbore, wherein the fiber optic cable extends longitudinally along the casing, and wherein the fiber optic cable includes one or more optical fibers;
   activating a reaction of the sealant by providing light via the fiber optic cable to produce heat that exceeds an activation energy of the sealant, the heating of the sealant resulting in curing of the sealant based on the light producing the heat that exceeds the activation energy of the sealant; and
   providing a gradient of the light such that a first portion of the sealant located at a lower part of the wellbore cures before a second portion of the sealant that is located at a higher part of the wellbore.

2. The method of claim 1, wherein the sealant is located in an annulus between the casing and an inner surface of a wellbore.

3. The method of claim 1, wherein the fiber optic cable begins the activation of the reaction at a downhole portion of the sealant and continues in an uphole direction.

4. The method of claim 1, wherein the heat produced reaches a temperature of at least 200° F.

5. The method of claim 1, wherein light is released from the fiber optic cable by micro-bends or macro-bends in the fiber optic cable.

6. The method of claim 1, wherein light is released from the fiber optic cable by shrinkage of the optical fiber.

7. The method of claim 1, wherein the sealant is cement.

8. The method of claim 1, wherein the sealant is resinous.

9. The method of claim 1, wherein the activation is an optical initiation from the fiber optic cable.

10. The method of claim 1, wherein the reaction is a photochemical reaction.

11. The method of claim 10, wherein the photochemical reaction is activated by light released from the fiber optic cable and contacting a photoinitiator.

12. The method of claim 11, wherein the photoinitiator is a member selected from the group of acetophenones, benozoins, benzophenones, thioxanthones, cationic photoinitiators, compounds with triphenylsulfononium ions, azo compounds, flavins, sodium salts and mixtures thereof.

13. The method of claim 11, wherein the photoinitiator reacts in presence of ultra-violet or visible light.

14. The method of claim 1, wherein light from the fiber optic cable is upconverted
   from infrared or near-infrared to ultraviolet or visible light.

15. The method of claim 1, wherein light from the fiber optic cable is upconverted via upconverters, the upconverters comprising lanthanides or rare-earth elements.

16. The method of claim 1, wherein the fiber optic cable emits light via a fiber fuse.

17. The method of claim 1, wherein the reaction is a degradation of a retardant within the sealant.

18. A system comprising:
   a fiber optic cable and a sealant arranged within an annulus between a casing and an inner surface of a wellbore, wherein the fiber optic cable extends longitudinally along the casing; and
   a light source that provides light via the fiber optic cable to activate a reaction of the sealant by producing heat that exceeds an activation energy of the sealant, the heating of the sealant resulting in curing of the sealant based on the light producing the heat that exceeds the activation energy of the sealant, wherein the fiber optic cable provides a gradient of the light such that a first portion of the sealant located at a lower part of the wellbore cures before a second portion of the sealant that is located at a higher part of the wellbore.

* * * * *